United States Patent
Kagawa et al.

(10) Patent No.: US 9,889,479 B2
(45) Date of Patent: Feb. 13, 2018

(54) METHOD FOR PRODUCING POROUS METAL FOIL

(71) Applicant: Seiji Kagawa, Koshigaya (JP)

(72) Inventors: Seiji Kagawa, Koshigaya (JP); Yoichiro Kagawa, Koshigaya (JP)

(73) Assignee: Seiji Kagawa, Koshigaya-Shi (JP)

( * ) Notice: Subject to any disclaimer, the term of this patent is extended or adjusted under 35 U.S.C. 154(b) by 653 days.

(21) Appl. No.: 14/526,788

(22) Filed: Oct. 29, 2014

(65) Prior Publication Data
US 2015/0114065 A1 Apr. 30, 2015

(30) Foreign Application Priority Data
Oct. 30, 2013 (JP) .................. 2013-225154

(51) Int. Cl.
*B32B 38/04* (2006.01)
*B21B 1/40* (2006.01)
(Continued)

(52) U.S. Cl.
CPC ............ *B21B 1/40* (2013.01); *B21B 15/0007* (2013.01); *B26F 1/08* (2013.01); *H01G 11/68* (2013.01); *H01G 11/70* (2013.01); *H01G 11/84* (2013.01); *H01M 4/661* (2013.01); *H01M 4/80* (2013.01); *H01M 4/82* (2013.01); *B26F 1/14* (2013.01); *B32B 37/0053* (2013.01);
(Continued)

(58) Field of Classification Search
CPC .. B61F 1/08; B61F 1/14; H01G 11/68; H01G 11/70; H01G 11/84; H01M 4/661; H01M 4/80; H01M 4/82; H01M 10/0525; Y02E 60/13; B32B 38/04; B32B 37/0053; Y10T 156/1056; Y10T 156/1057
See application file for complete search history.

(56) References Cited

U.S. PATENT DOCUMENTS

| 5,648,107 A | 7/1997 | Kagawa et al. |
| 2012/0219817 A1 | 8/2012 | Konishi et al. |

(Continued)

FOREIGN PATENT DOCUMENTS

| EP | 2594385 A2 | 5/2013 |
| JP | 7-164535 A | 6/1995 |

(Continued)

OTHER PUBLICATIONS

Japanese Office Action issued in 2013-225154, dated May 10, 2014.
(Continued)

*Primary Examiner* — Linda L Gray
(74) *Attorney, Agent, or Firm* — Birch, Stewart, Kolasch & Birch, LLP

(57) ABSTRACT

A method for producing a porous metal foil comprising causing a metal foil together with a soft sheet to pass through a gap between a pattern roll of a hard metal, which has high-hardness, fine particles having particle sizes of 50-500 μm on the surface, and a hard metal roll opposing the pattern roll, to press the metal foil and the soft sheet, thereby forming fine pores in the metal foil; the soft sheet being a laminate sheet of a relatively hard plastic layer and a relatively soft plastic layer; and the pressing of the metal foil being conducted with the relatively hard plastic layer on the side of the metal foil, and the relatively soft plastic layer on the side of the hard metal roll.

4 Claims, 2 Drawing Sheets

(51) Int. Cl.
*H01G 11/70* (2013.01)
*H01G 11/68* (2013.01)
*H01G 11/84* (2013.01)
*H01M 4/66* (2006.01)
*B21B 15/00* (2006.01)
*H01M 4/82* (2006.01)
*H01M 4/80* (2006.01)
*B26F 1/08* (2006.01)
*B32B 37/00* (2006.01)
*B61F 1/08* (2006.01)
*H01M 10/0525* (2010.01)
*B26F 1/14* (2006.01)

(52) U.S. Cl.
CPC .............. *B32B 38/04* (2013.01); *B61F 1/08* (2013.01); *H01M 10/0525* (2013.01); *Y02E 60/13* (2013.01); *Y10T 156/1056* (2015.01); *Y10T 156/1057* (2015.01)

(56) References Cited

U.S. PATENT DOCUMENTS

2012/0264022 A1  10/2012  Hosoe et al.
2013/0129852 A1   5/2013  Kagawa et al.

FOREIGN PATENT DOCUMENTS

| JP | 2001-79795 A | 3/2001 |
| JP | 2002-59487 A | 2/2002 |
| JP | 2002-216775 A | 8/2002 |
| JP | 2004-142780 A | 5/2004 |
| JP | 2011-74468 A | 4/2011 |
| JP | 2011-165637 A | 8/2011 |
| JP | 2012-186142 A | 9/2012 |

OTHER PUBLICATIONS

Translation of Argument filed in response to the Office Action issued in 2013-225154, dated Feb. 6, 2014.
Extended Eurpean Search Report dated Apr. 2, 2015, for European Application No. 14188991.5.

METHOD FOR PRODUCING POROUS METAL FOIL

FIELD OF THE INVENTION

The present invention relates to a method for efficiently producing a porous metal foil such as a porous aluminum foil, etc., suitable for current collectors in lithium ion batteries, lithium ion capacitors, electric double-layer capacitors, etc.

BACKGROUND OF THE INVENTION

To provide lithium ion batteries, lithium ion capacitors, electric double-layer capacitors, etc. with increased energy densities, current collectors preferably have penetrating pores to reduce positive electrode potential. Aluminum foils are widely used for current collectors, and penetrating pores are formed by various methods.

For example, JP 2011-74468 A discloses a method for producing a high-strength, porous aluminum foil by simultaneously drawing and bending an aluminum foil having large numbers of penetrating pores. The penetrating pores having inner diameters of 0.2-5 µm are formed by subjecting the aluminum foil to DC etching in an electrolyte comprising hydrochloric acid as a main component to form etched pits, and adjusting the diameters of the etched pits by chemical etching. However, because the etched pits have small inner diameters, a sufficient amount of an active material does not enter the penetrating pores, failing to obtain a sufficiently high energy density.

JP 2011-165637 A discloses a method for producing a positive current collector, which is provided with a positive active material layer to form a positive electrode of a lithium ion battery, the positive current collector being constituted by an aluminum alloy foil provided with pluralities of pit-like pores on the surface on which the positive active material layer is to be formed, the pores having an average pore diameter of 1.0-5 µm, and a ratio of average pore diameter/average pore depth being 1.0 or less, the method comprising the steps of subjecting the aluminum alloy foil to DC electrolytic etching, and treating the etched aluminum alloy foil with an aqueous organic phosphoric acid solution. However, because pit-like pores formed by DC electrolytic etching have as small an average pore diameter as 5 µm or less, a sufficient amount of an active material does not enter the pit-like pores.

JP 2012-186142 A discloses a method for producing an electrode for electrochemical devices, which is constituted by pluralities of laminated porous aluminum sheets filled with an active material, comprising the steps of filling each porous aluminum sheet with the active material, compressing it to provide a thin, porous aluminum sheet, and then laminating pluralities of active-material-filled, thin, porous aluminum sheets.

The porous aluminum sheet is produced, for example, by forming a eutectic alloy coating at a temperature equal to or lower than the melting point of Al on a foamed resin having a three-dimensional network structure by a plating method, a vapor deposition method, a sputtering method, CVD method, etc., impregnating the foamed resin with a paste comprising Al powder, a binder and an organic solvent as main components, and then heat-treating it in a non-oxidizing atmosphere at a temperature of 550-750° C. However, this porous aluminum sheet is disadvantageous not only in a complicated production method, but also in poor mechanical strength because of the three-dimensional network structure.

In view of the above circumstances, a porous metal foil such as a porous aluminum foil, etc. having sufficient fine pores to hold an active material, as well as high mechanical strength, which is suitably usable in lithium ion batteries, lithium ion capacitors, electric double-layer capacitors, etc., is desired.

OBJECT OF THE INVENTION

Accordingly, an object of the present invention is to provide a method for efficiently producing a porous metal foil having sufficient fine pores to hold an active material, as well as high mechanical strength.

DISCLOSURE OF THE INVENTION

As a result of intensive research in view of the above object, the inventor has found that when large numbers of fine pores are formed in a metal foil by causing the metal foil to pass through a gap between a pattern roll having high-hardness, fine particles having particle sizes of 50-500 µm on the surface and a metal roll opposing the pattern roll, to press the metal foil, the coexistence of a thin, soft laminate sheet comprising a relatively hard plastic layer and a relatively soft plastic layer and the metal foil between both rolls, with the relatively hard plastic layer on the metal foil side, can avoid the breakage of the metal foil in forming fine, penetrating pores. The present invention has been completed based on such finding.

Thus, the method of the present invention for producing a porous metal foil comprises causing a metal foil together with a soft sheet to pass through a gap between a pattern roll of a hard metal, which has high-hardness, fine particles having particle sizes of 50-500 µm on the surface, and a hard metal roll opposing the pattern roll, to press the metal foil together with the soft sheet, thereby forming fine pores in the metal foil; the soft sheet being a laminate sheet of a relatively hard plastic layer and a relatively soft plastic layer; and the pressing of the metal foil being conducted with the relatively hard plastic layer on the side of the metal foil, and the relatively soft plastic layer on the side of the hard metal roll.

In the above method, a soft plastic material for the soft sheet is preferably polyethylenes or polyvinyl chloride.

The hardness (Durometer Shore A) of the soft sheet is preferably 20-80, more preferably 30-70. The soft sheet is preferably as thick as 0.05-2 mm.

The soft sheet is preferably a laminate sheet of a polyethylene terephthalate layer and a polyethylene layer.

In the above method, the soft sheet is preferably bonded to the metal foil in advance with an easy-to-peel adhesive.

The pattern roll preferably has fine particles having sharp edges and Mohs hardness of 5 or more on the surface. The fine particles are preferably attached to a roll surface at an area ratio of 30-80%.

A roll body of the pattern roll and the hard metal roll are preferably made of die steel.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

Figure 1:
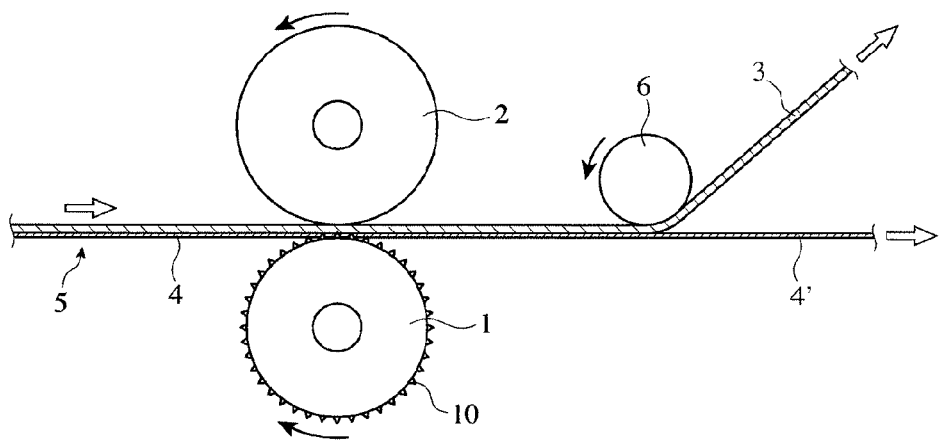
FIG. 1 is a schematic cross-sectional view showing the method of the present invention.

As shown in FIG. 1, a pattern roll 1 of hard metal, which has high-hardness, fine particles 10 on the surface, and a hard metal roll 2 opposing the pattern roll 1 are used. A metal foil 4 and a soft sheet 3 are caused to pass through a gap between both rolls 1, 2.

(A) Pattern Roll

Figure 2:
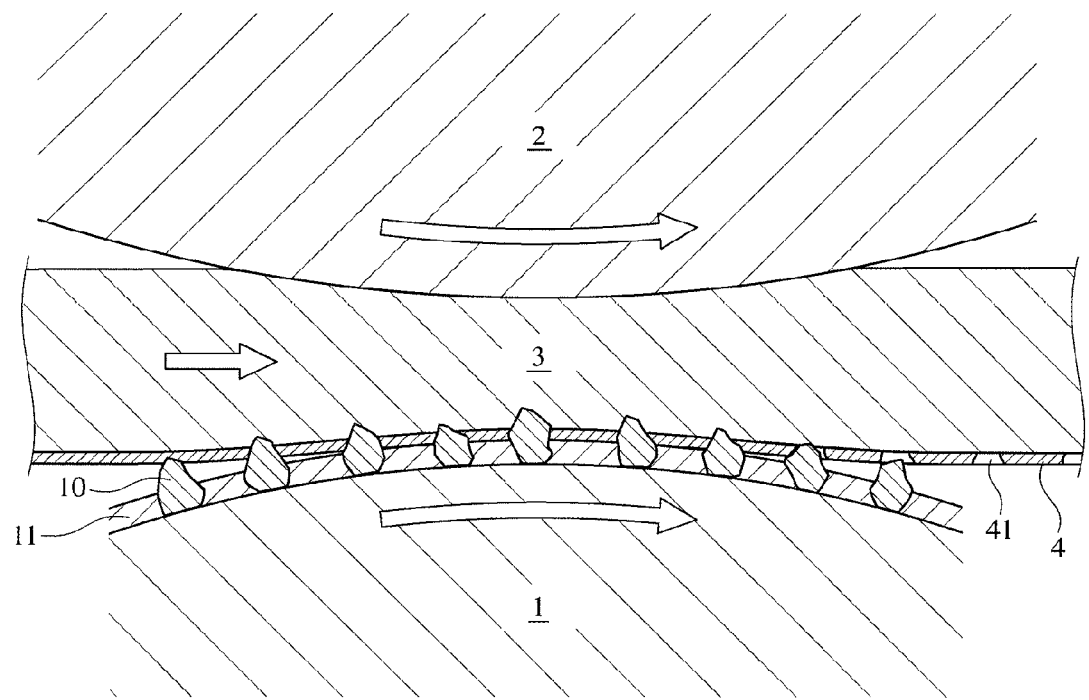
FIG. 2 is a partial, enlarged cross-sectional view showing in detail the formation of pores in a metal foil with high-hardness, fine particles in the method of the present invention.

The pattern roll 1 is preferably a roll having fine particles 10 having sharp edges and Mohs hardness of 5 or more on the surface as shown in FIG. 2 in detail, for example, a diamond roll described in JP 2002-59487 A. Fine particles 10 of diamond, etc. have particle sizes of 50-500 preferably 60-300 μm. The area ratio of fine particles 10 on the pattern roll 1 (ratio of fine particles occupying the roll surface) is preferably 30-80%, more preferably 50-80%. The fine particles 10 are fixed to a roll body by a nickel plating layer 11, etc.

To avoid the bending of the pattern roll 1 while forming pores, the roll body of the pattern roll 1 is preferably made of a hard metal. The hard metal may be die steel such as SKD11.

(B) Hard Metal Roll

The hard metal roll 2 opposing the pattern roll 1 is also preferably made of a hard metal such as die steel to avoid bending while forming pores.

(C) Metal Foil Laminate

The soft sheet 3 and the metal foil 4 caused to pass through a gap between the pattern roll 1 and the hard metal roll 2 to form pores in the metal foil 4 are preferably in the form of a laminate 5 for ease of handling.

(1) Soft Sheet

The soft sheet 3 is a laminate sheet of a relatively hard plastic layer and a relatively soft plastic layer. The relatively hard plastics include polyesters such as polyethylene terephthalate, etc., and the relatively soft plastics include polyethylenes or polyvinyl chloride. Polyethylenes may be low-density polyethylene, an ethylene-vinyl acetate copolymer, etc. The relatively hard plastic layer is positioned on the side of the metal foil 4, and the relatively soft plastic layer is positioned on the side of the hard metal roll 2.

The soft sheet 3 preferably has hardness (Durometer Shore A) of 20-80. The soft sheet 3 with Shore A hardness of less than 20 is too soft, so that the metal foil 4 is largely deformed and likely broken while forming pores. On the other hand, the soft sheet 3 with Shore A hardness of more than 80 is too hard to permit fine particles 10 on the pattern roll 1 to penetrate, failing to form fine pores in the metal foil 4 sufficiently. The hardness of the soft sheet 3 may be determined properly within the above range, depending on the type and thickness of the metal foil 4, the size of fine pores to be formed, etc.

The soft sheet 3 is preferably as thick as 0.05-2 mm. When the thickness of the soft sheet 3 is less than 0.05 mm, large ones among fine particles 10 on the pattern roll 1 may penetrate the soft sheet 3 to reach the hard metal roll 2. On the other hand, when the thickness of the soft sheet 3 is more than 2 mm, the soft sheet 3 is deformed too much while forming pores, so that the metal foil 4 may be broken. The thickness of the soft sheet 3 is more preferably 0.1-1.5 mm.

In the soft sheet 3, the relatively hard plastic layer is preferably as thick as 10-30 μm, the balance being the relatively soft plastic layer.

(2) Metal Foil

The metal foil 4 to be provided with pores is preferably an aluminum foil or a copper foil. Particularly an aluminum foil is preferable, because it can be used for current collectors in lithium ion batteries, lithium ion capacitors, electric double-layer capacitors, etc. Though arbitrarily selected, the thickness of the metal foil 4 may be about 10-30 μm, for example, when used for current collectors.

(3) Lamination

Because the soft sheet 3 should be peeled from the metal foil 4 after forming pores, the soft sheet 3 and the metal foil 4 may be laminated by an easy-to-peel adhesive. The easy-to-peel adhesive per se is known, for example, a composition comprising 50% by mass of low-density polyethylene (Petrothene 208 available from Tosoh Corporation), 35% by mass of crystalline polypropylene (Novatec PP FW4BT available from Japan Polypropylene Corporation), and 15% by mass of low-molecular-weight polyethylene wax (SANWAX 151-P available from Sanyo Chemical Industries, Ltd.), etc.

(D) Pore-Forming Method

When a laminate 5 of the metal foil 4 and the soft sheet 3 is caused to pass through a gap between the pattern roll 1 and the hard metal roll 2, the laminate 5 is compressed by the pattern roll 1 and the hard metal roll 2, so that fine particles 10 on the pattern roll 1 penetrate the metal foil 4 and enter the soft sheet 3, as shown in FIG. 2. It should be noted that fine particles 10, etc. are exaggerated for clarity in FIG. 2.

Because the soft sheet 3 compressed between the pattern roll 1 and the hard metal roll 2 has sufficiently large compression resistance, it is not substantially subject to further compression by a force necessary for fine particles 10 to penetrate the metal foil 4. Accordingly, fine particles 10 projecting from the surface of the pattern roll 1 can penetrate the metal foil 4 in contact with the compressed soft sheet 3. Because the compressed soft sheet 3 has sufficiently large compression resistance with local deformability, it is easily deformed by fine particles 10 penetrating the metal foil 4. As a result, fine particles 10 intrude the soft sheet 3.

Figure 3:
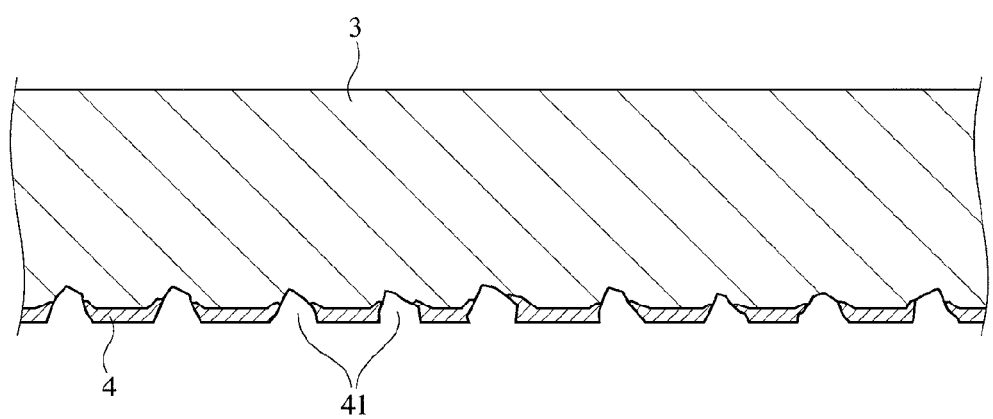
FIG. 3 is a cross-sectional view showing a laminate comprising a metal foil having fine pores formed by the method of the present invention.

As shown in FIG. 3, the metal foil 4 having large numbers of fine pores 41 formed by fine particles 10 of the pattern roll 1 has slightly projecting burrs on the side of the soft sheet 3, and the burrs can be removed by a subsequent treatment. In FIG. 3, the soft sheet 3 is made of a soft plastic.

When fine particles 10 penetrating the metal foil 4 are detached from the metal foil 4 and the soft sheet 3 by the rotation of the pattern roll 1, the soft sheet 3 remains dented with large numbers of fine pores 41 left in the metal foil 4 (in the case of a soft plastic). The metal foil 4 having large numbers of fine pores 41 is peeled from the soft sheet 3 after passing the guide roll 6, and wound as a porous metal foil 4' by a reel (not shown). The porous metal foil 4' preferably has 500-1500/cm$^2$ of fine pores 41.

The present invention will be explained in more detail with Examples below without intention of restricting the present invention thereto.

Example 1

In the method shown in FIG. 1, a pattern roll 1 having fine diamond particles 10 having particle sizes of 200-350 μm, which were attached to a roll of SKD11 having an outer diameter of 200 mm by nickel plating, and a hard roll 2 of SKD11 having an outer diameter of 200 mm were used. A 20-μm-thick aluminum foil 4, and a laminate sheet 3 of a 12-μm-thick polyethylene terephthalate layer and a 40-μm-thick polyethylene layer were caused to pass through a gap between both rolls 1, 2 rotating at 50 rpm, to form fine pores 41 in the aluminum foil 4. The number of fine pores 41 was about 600/cm$^2$. Observation revealed that the resultant porous aluminum foil 5 was free from breakage.

Figure 4:
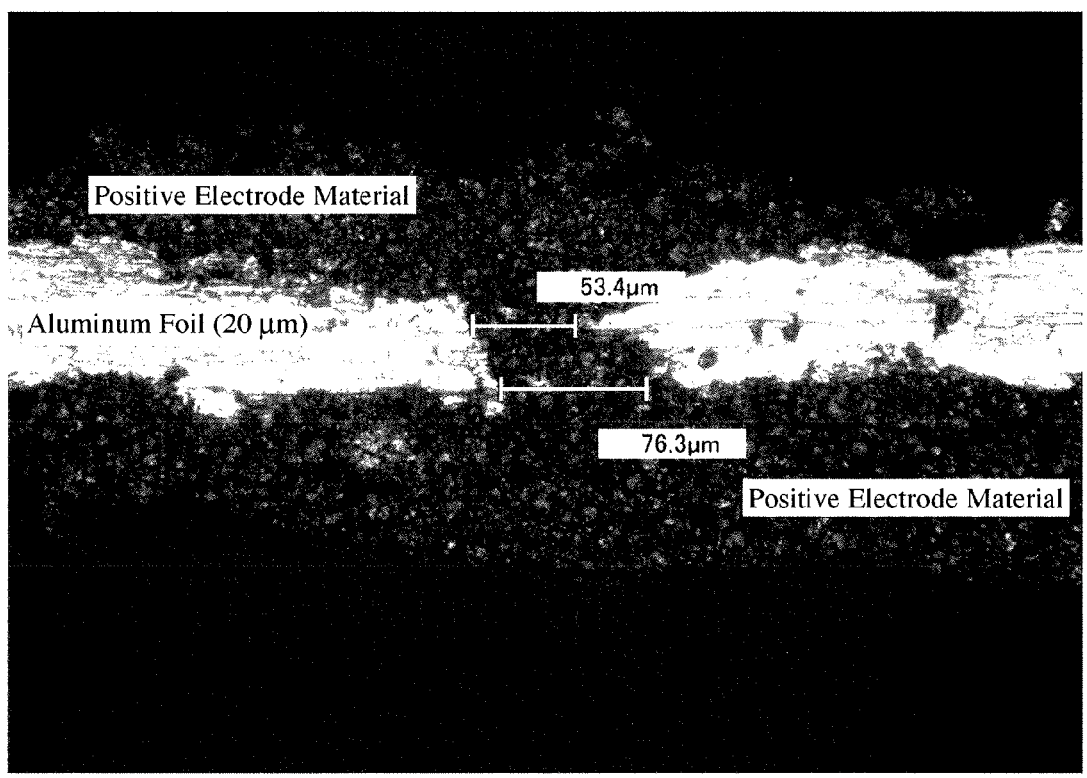
FIG. 4 is a photomicrograph showing a cross section of a porous aluminum foil produced in Example 1, which is covered with a positive electrode material.

Both surfaces of the porous aluminum foil 5 were coated with a positive electrode material for a lithium ion battery, dried at 120° C., and roll-pressed. The positive electrode material had a composition comprising 100 parts by weight of lithium nickel cobalt manganese oxide (NCM) as an active material, 3 parts by weight of acetylene black (HS-100 available from Denki Kagaku Kogyo Kabushiki Kaisha) as a conductive additive 1, 3 parts by weight of graphite powder (KS6L available from Timcal Graphite and Carbon) as a conductive additive 2, 3 parts by weight of polyvinylidene fluoride (PVDF) as a binder, and 61 parts by weight of N-methyl-2-pyrrolidone as a solvent. The microscopic observation results are shown in FIG. 4. It was confirmed from FIG. 4 that fine pores 41 were filled with the positive electrode material. This indicates that the porous aluminum foil of the present invention is suitable for current collectors in lithium ion batteries, lithium ion capacitors, electric double-layer capacitors, etc.

EFFECTS OF THE INVENTION

In the method of the present invention for producing a porous metal foil, a metal foil is caused to pass through a gap between a pattern roll of a hard metal, which has high-hardness, fine particles having particle sizes of 50-500 μm on the surface, and a hard metal roll, together with a soft laminate sheet comprising a relatively hard plastic layer and a relatively soft plastic layer, and pressed with the relatively hard plastic layer on the metal foil side.

Accordingly, large numbers of fine pores can be formed in the metal foil without breakage. Thus, the method of the present invention can produce a porous metal foil such as a porous aluminum foil, etc. suitable for current collectors in lithium ion batteries, lithium ion capacitors, electric double-layer capacitors, etc., at a high speed and a low cost.

What is claimed is:

1. A method for producing a porous metal foil comprising causing a metal foil together with a soft sheet to pass through a gap between a pattern roll of a hard metal, which has high-hardness, fine particles having particle sizes of 50-500 μm on the surface, and a hard metal roll opposing said pattern roll, to press said metal foil together with said soft sheet, thereby forming fine pores in said metal foil; said soft sheet being a laminate sheet of a relatively hard plastic layer and a relatively soft plastic layer; and the pressing of said metal foil being conducted with said relatively hard plastic layer on the side of said metal foil, and said relatively soft plastic layer on the side of said hard metal roll.

2. The method for producing a porous metal foil according to claim 1, wherein said soft sheet is a laminate sheet constituted by a polyethylene terephthalate layer and a polyethylene layer.

3. The method for producing a porous metal foil according to claim 1, wherein said soft sheet has hardness (Durometer Shore A) of 20-80.

4. The method for producing a porous metal foil according to claim 2, wherein said soft sheet has hardness (Durometer Shore A) of 20-80.

* * * * *